United States Patent
Tatekawa (10) Patent No.: US 8,476,179 B2
(45) Date of Patent: Jul. 2, 2013

(54) GRAIN BOUNDARY-INSULATED SEMICONDUCTOR CERAMIC, SEMICONDUCTOR CERAMIC CAPACITOR, AND METHOD FOR PRODUCING SEMICONDUCTOR CERAMIC CAPACITOR

(75) Inventor: Tsutomu Tatekawa, Nagaokakyo (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 24 days.

(21) Appl. No.: 13/358,732

(22) Filed: Jan. 26, 2012

(65) Prior Publication Data

US 2012/0217615 A1    Aug. 30, 2012

(30) Foreign Application Priority Data

Feb. 24, 2011  (JP) ................................. 2011-038259

(51) Int. Cl.
*C04B 35/47* (2006.01)

(52) U.S. Cl.
USPC ...................... 501/136; 361/321.5; 361/321.6

(58) Field of Classification Search
USPC ............................. 501/136; 361/321.5, 321.6
See application file for complete search history.

(56) References Cited

U.S. PATENT DOCUMENTS

| | | | | |
|---|---|---|---|---|
| 5,075,818 A | * | 12/1991 | Ueno et al. | 361/321.4 |
| 5,378,667 A | * | 1/1995 | Kim et al. | 501/136 |
| 7,990,678 B2 | * | 8/2011 | Kawamoto et al. | 361/321.4 |

FOREIGN PATENT DOCUMENTS

| | | |
|---|---|---|
| JP | 02111006 A | 4/1990 |
| JP | 03285870 A | 12/1991 |

* cited by examiner

*Primary Examiner* — Karl Group
(74) *Attorney, Agent, or Firm* — Dickstein Shapiro LLP (57) ABSTRACT

A grain boundary-insulated semiconductor ceramic contains a $SrTiO_3$-based compound as a main component, and a diffusing agent containing a grain boundary insulating agent and a glass component. The grain boundary insulating agent is composed of a material free of lead, the glass component mainly contains a $SiO_2$—$X_2O$-MO—$TiO_2$-based glass material that does not contain boron or lead and in which X represents an alkali metal, and M represents at least one of barium, strontium, and calcium, and the content of the glass component is 3 to 15 parts by weight relative to 100 parts by weight of the grain boundary insulating agent. A component base is composed of the grain boundary-insulated semiconductor ceramic.

19 Claims, 7 Drawing Sheets

GRAIN BOUNDARY-INSULATED SEMICONDUCTOR CERAMIC, SEMICONDUCTOR CERAMIC CAPACITOR, AND METHOD FOR PRODUCING SEMICONDUCTOR CERAMIC CAPACITOR

BACKGROUND OF THE INVENTION

1. Field of the Invention

The present invention relates to a grain boundary-insulated semiconductor ceramic, a semiconductor ceramic capacitor, and a method for producing a semiconductor ceramic capacitor. More specifically, the present invention relates to a grain boundary-insulated semiconductor ceramic containing $SrTiO_3$ as a main component and a diffusing agent that contains a grain boundary insulating agent and a glass component, a semiconductor ceramic capacitor including the grain boundary-insulated semiconductor ceramic, and a method for producing the semiconductor ceramic capacitor.

2. Description of the Related Art

Grain boundary-insulated semiconductor ceramic capacitors are capacitors in which the apparent dielectric constant is increased by forming semiconductor crystal grains and insulating crystal grain boundaries, and are widely known as capacitors having small sizes and large capacitances.

For example, Japanese Unexamined Patent Application Publication No. 3-285870 (Patent Literature 1) discloses a grain boundary-insulated semiconductor porcelain composition in which a crystal grain boundary of semiconductor porcelain represented by a general formula $(Sr_{1-x-z}Ba_x Ca_zM_y)+Ti_lO_3+mN+nZ$ (where M represents at least one element selected from Nb, Ta, W, and rare-earth elements, N represents at least one element selected from Mn, Al, etc., and Z represents at least one of Pb and B) wherein x, y, z, l, m, and n are each within a predetermined range, is insulated by a compound containing at least one of Cu, Bi, Pb, B, and Si.

In Patent Literature 1, a $Bi_2O_3$—$Pb_3O_4$—$B_2O_3$—$CuO$—$SiO_2$-based material is used as a grain boundary insulating agent that insulates grain boundaries in the semiconductor porcelain containing $SrTiO_3$ as a main component, and this material is diffused during heat treatment to form a desired grain boundary insulating layer. Thus, a semiconductor ceramic capacitor having a large product of the apparent dielectric constant and the breakdown voltage is obtained.

Japanese Unexamined Patent Application Publication No. 2-111006 (Patent Literature 2) discloses a method for producing a grain boundary-insulated semiconductor porcelain capacitor, the method including steps of preparing a semiconductor porcelain; mixing the semiconductor porcelain with a diffusing agent prepared by adding a glass powder to a grain boundary insulating agent that insulates grain boundaries of the semiconductor porcelain in an amount of 1% by weight to 100% by weight relative to the grain boundary insulating agent, and heat-treating the resulting mixture while stirring to insulate the grain boundaries of the semiconductor porcelain; and forming electrodes by plating on both main surfaces of the semiconductor porcelain whose grain boundaries have been insulated.

In Patent Literature 2, a diffusing agent containing a $Bi_2O_3$—$PbO$—$CuO$-based grain boundary insulating agent and a $Bi_2O_3$—$PbO$—$CuO$—$B_2O_3$-based glass powder is mixed and stirred with $SrTiO_3$-based semiconductor porcelain to prepare semiconductor porcelain. Thus, variations in electrostatic capacity are reduced.

Recently, the consciousness of environmental issues has been increasing worldwide. In the European Union (EU), in particular, regulation of the use of lead (Pb), which causes environmental pollution, has been provided by, for example, the Restriction of Hazardous Substances (RoHS) that restricts the use of certain hazardous substances in electrical and electronic equipment and the End of Life Vehicles Directive (ELV) that prescribes environmental regulation of end-of-life vehicles. Accordingly, development of materials which are an alternative to Pb-based materials has been urgently required.

However, the $Bi_2O_3$—$Pb_3O_4$—$B_2O_3$—$CuO$—$SiO_2$ based material of Patent Literature 1 contains Pb in the grain boundary insulating agent. The content of $Pb_3O_4$ is small but when the $Pb_3O_4$ is removed from the grain boundary insulating agent, the diffusing power of the grain boundary insulating agent decreases during heat treatment and it becomes difficult to sufficiently oxidize crystal grain boundaries. In particular, the grain boundary insulating agent does not sufficiently thermally diffuse in a semiconductor ceramic capacitor having a tubular shape such as a circular tube or a rectangular tube and having a large wall thickness into the inside of the capacitor, which may result in a decrease in electrical properties.

In Patent Literature 2, Pb is used in both the grain boundary insulating agent and the glass powder, and thus the same problem as that in Patent Literature 1 occurs. In addition, boron (B) is contained in the glass component of Patent Literature 2. When B is incorporated in the glass component, although the effect of increasing the diffusing power can be obtained to a certain degree, the insulation resistance and the breakdown voltage tend to decrease, which may result in a decrease in electrical properties.

SUMMARY OF THE INVENTION

The present invention has been made in view of the above circumstances, and it is an object of the present invention to provide a grain boundary-insulated semiconductor ceramic in which good electrical properties can be obtained without using a Pb-based material as a diffusing agent, a semiconductor ceramic capacitor including the grain boundary-insulated semiconductor ceramic, and a method for producing the semiconductor ceramic capacitor.

The inventor of the present invention has conducted intensive studies in order to achieve the above object. As a result, it was found that, by using a material free of Pb, such as a Bi—Cu-based material, as a grain boundary insulating agent and using a $SiO_2$—$X_2O$-$MO$—$TiO_2$-based glass material that does not contain B or Pb (where X represents an alkali metal and M represents at least one element selected from Ba, Sr, and Ca) as a glass component, a grain boundary-insulated semiconductor ceramic having good electrical properties can be obtained without decreasing the insulation resistance or the breakdown voltage, even though the diffusing agent is composed of a non-Pb material.

The present invention has been made on the basis of the above finding. A grain boundary-insulated semiconductor ceramic according to a preferred embodiment of the present invention includes a $SrTiO_3$-based compound as a main component, and a diffusing agent containing a grain boundary insulating agent and a glass component, wherein the grain boundary insulating agent is composed of a material free of lead, the glass component mainly contains a $SiO_2$—$X_2O$-$MO$—$TiO_2$-based glass material that does not contain boron or lead (where X represents an alkali metal, and M represents at least one element selected from barium, strontium, and calcium), and the content of the glass component is 3 to 15 parts by weight relative to 100 parts by weight of the grain boundary insulating agent.

The grain boundary insulating agent preferably contains at least bismuth and copper.

The content of the grain boundary insulating agent is preferably 0.8 to 1.5 parts by weight relative to 100 parts by weight of the main component.

Furthermore, the alkali metal X in the glass component is preferably lithium.

A semiconductor ceramic capacitor according to a preferred embodiment of the present invention includes a component base composed of any of the above grain boundary-insulated semiconductor ceramics.

The component base preferably has a tubular shape, and an electrode is preferably provided on each of an inner peripheral surface and an outer peripheral surface of the component base.

A method for producing a semiconductor ceramic capacitor according to a preferred embodiment of the present invention includes the steps of preparing a sintered body by mixing a plurality of ceramic raw materials including at least a strontium compound and a titanium compound and firing the resulting mixture in a reducing atmosphere, weighing a grain boundary insulating agent composed of a material free of lead and a glass component composed of a $SiO_2$—$X_2O$-MO—$TiO_2$-based glass material that does not contain boron or lead (where X represents an alkali metal, and M represents at least one of barium, strontium, and calcium), and preparing a component base by performing a heat treatment in an air atmosphere while mixing and stirring the sintered body with the grain boundary insulating agent and the glass component.

In the method, the sintered body is preferably prepared so as to have a tubular shape, and the method preferably further includes a step of forming an electrode on each of the inner peripheral surface and the outer peripheral surface of the component base by a plating process.

Furthermore, the grain boundary insulating agent and the glass component in the method are preferably weighed so that the amount of the glass component is 3 to 15 parts by weight relative to 100 parts by weight of the grain boundary insulating agent.

In a grain boundary-insulated semiconductor ceramic according to a preferred embodiment of the present invention, the grain boundary insulating agent is composed of a material free of Pb, such as a Bi—Cu-based material, and the glass component contains, as a main component, a $SiO_2$—$X_2O$-MO—$TiO_2$-based glass material that does not contain B or Pb (where X represents an alkali metal such as Li, and M represents at least one element selected from Ba, Sr, and Ca), and the content of the glass component is 3 to 15 parts by weight relative to 100 parts by weight of the grain boundary insulating agent. Accordingly, even though Pb is not present, it is possible to obtain a grain boundary-insulated semiconductor ceramic having electrical properties equal to or better than those in the case where a Pb-based diffusing agent is used, without causing a decrease in the insulation resistance or the breakdown voltage.

According to the semiconductor ceramic capacitor of a preferred embodiment of the present invention, a component base is composed of the above-described grain boundary-insulated semiconductor ceramic. Accordingly, even in the case where a non-Pb material is used as a semiconductor ceramic, a semiconductor ceramic capacitor having good electrical properties can be obtained.

Furthermore, the component base is formed so as to have a tubular shape, and an electrode is formed on each of the inner peripheral surface and the outer peripheral surface of the component base, and thus the diffusing agent is uniformly or substantially uniformly distributed over the entire component base. Therefore, even in the case where the component base has a large wall thickness, it is possible to obtain a semiconductor ceramic capacitor that has good electrical properties, such as electrostatic capacity, insulation resistance, and breakdown voltage and that is excellent in terms of practical use.

The method for producing a semiconductor ceramic capacitor according to a preferred embodiment of the present invention includes the steps of preparing a sintered body by mixing a plurality of ceramic raw materials including at least a strontium compound and a titanium compound and firing the resulting mixture in a reducing atmosphere, weighing (providing) a grain boundary insulating agent composed of a material free of lead and a glass component composed of a $SiO_2$—$X_2O$-MO—$TiO_2$-based glass material that does not contain boron or lead (where X represents an alkali metal, and M represents at least one of barium, strontium, and calcium), and preparing a component base by performing a heat treatment in an air atmosphere while mixing and stirring the sintered body with the grain boundary insulating agent and the glass component. Accordingly, the diffusing agent containing the grain boundary insulating agent and the glass component has a diffusing power substantially the same as that of a lead-based diffusing agent. Therefore, even when the sintered body has a tubular shape with a large wall thickness, the diffusing agent can be uniformly or substantially uniformly distributed in the component base. Thus, grain boundaries can be uniformly oxidized, and a desired grain boundary insulating layer can be formed. The semiconductor ceramic capacitor obtained has good electrical properties such as electrostatic capacity, insulation resistance, and breakdown voltage, and is excellent in terms of practical use.

Other features, elements, characteristics and advantages of the present invention will become more apparent from the following detailed description of preferred embodiments of the present invention with reference to the attached drawings.

DESCRIPTION OF THE PREFERRED EMBODIMENTS

Embodiments of the present invention will now be described in detail.

Figure 1:
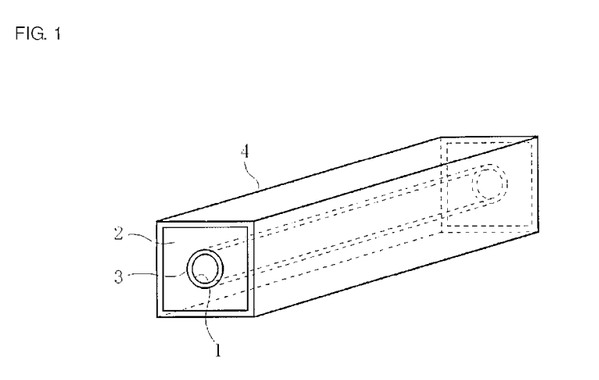
FIG. 1 is a perspective view that schematically illustrates an embodiment (first embodiment) of a semiconductor ceramic capacitor obtained using a grain boundary-insulated semiconductor ceramic of the present invention.
Figure 2:
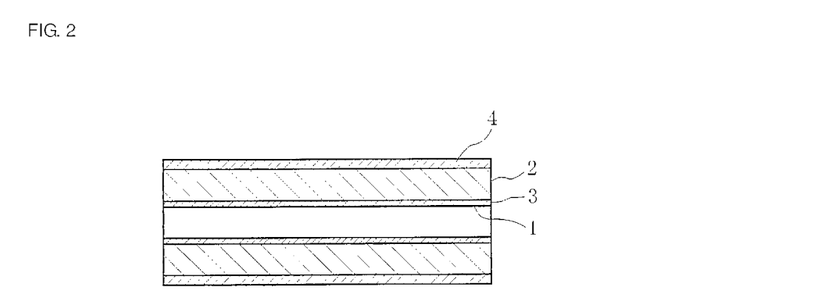
FIG. 2 is a longitudinal cross-sectional view of FIG. 1.

FIG. 1 is a perspective view that schematically illustrates a first embodiment of a semiconductor ceramic capacitor obtained using a grain boundary-insulated semiconductor ceramic of the present invention. FIG. 2 is a longitudinal cross-sectional view of FIG. 1.

The semiconductor ceramic capacitor includes a component base 2 which has a shape of a substantially rectangular tube and in which a through-hole 1 is formed. An inner peripheral electrode 3 is formed on the inner peripheral surface of the component base 2, and an outer peripheral electrode 4 is formed on the outer peripheral surface of the component base 2.

For example, this semiconductor ceramic capacitor is sandwiched and fixed between a pair of inductance elements such as ferrite beads, and widely used as a noise filter.

The component base 2 is specifically composed of a grain boundary-insulated semiconductor ceramic. This grain boundary-insulated semiconductor ceramic is made up of an aggregate containing semiconductor crystal grains and a grain boundary insulating layer formed around the crystal grains. The crystal grains form an electrostatic capacity with the grain boundary insulating layer therebetween.

The grain boundary-insulated semiconductor ceramic contains a $SrTiO_3$-based material as a main component and a diffusing agent as an accessory component. In the grain boundary-insulated semiconductor ceramic, semiconductor crystal grains are formed by a firing treatment in a reducing atmosphere, and a metal oxide is thermally diffused from the surfaces of the crystal grains by heat treatment performed after the firing treatment so that crystal grain boundaries are oxidized and insulated. Thus, a grain boundary insulating layer is formed.

The diffusing agent contains a grain boundary insulating agent that contributes to insulate crystal grain boundaries and a glass component that functions as a thermal diffusion promoting agent.

A material free of Pb is used as the grain boundary insulating agent. Since Pb causes environmental pollution, the Pb is eliminated from this grain boundary insulating agent in order to reduce the environmental burden.

The grain boundary insulating agent is not particularly limited as long as the grain boundary insulating agent is composed of a non-Pb material and forms a desired grain boundary insulating layer by thermal diffusion. However, from the standpoint of obtaining electrical properties equal to or better than those obtained in the case where a Pb-based material is used, a metal oxide containing at least Bi and Cu is preferably used as the grain boundary insulating agent.

The glass component contains, as a main component, a $SiO_2$—$X_2O$-MO—$TiO_2$-based glass material that does not contain B or Pb. In the above formula, X represents an alkali metal, and typical examples of the alkali metal include Li, Na, and K. Among these alkali metals X, Li is preferably used. In the above formula, M represents at least one element selected from Ba, Sr, and Ca.

As in the case of the grain boundary insulating agent, since Pb causes environmental pollution, Pb is excluded from this glass component in order to reduce the environmental burden. The reason why B is excluded from the glass component is as follows: In the case of borosilicate glass containing B as a glass component, although the diffusing power can be improved to a certain degree, the insulation resistance and the breakdown voltage tend to decrease. Consequently, electrical properties may decrease compared with the case where a Pb-based diffusing agent is used.

The glass component is incorporated so that the content of the glass component is about 3 to 15 parts by weight relative to 100 parts by weight of the grain boundary insulating agent. When the content of the glass component is less than about 3 parts by weight relative to 100 parts by weight of the grain boundary insulating agent, electrical properties such as electrostatic capacity, insulation resistance, and breakdown voltage may degrade. On the other hand, when the content of the glass component exceeds about 15 parts by weight relative to 100 parts by weight of the grain boundary insulating agent, although a satisfactory insulation resistance and breakdown voltage are obtained, the electrostatic capacity may decrease, and parts of the component base 2 may adhere to each other during the heat treatment.

Accordingly, it is necessary to incorporate the glass component in an amount of about 3 to 15 parts by weight relative to 100 parts by weight of the grain boundary insulating agent in order to ensure desired electrical properties.

As described above, the grain boundary insulating agent in this embodiment is composed of a material free of Pb, such as a Bi—Cu-based material, the glass component contains, as a main component, a $SiO_2$—$X_2O$-MO—$TiO_2$-based glass material that does not contain B or Pb, and the content of the glass component is about 3 to 15 parts by weight relative to 100 parts by weight of the grain boundary insulating agent. Therefore, even though Pb is not present, it is possible to obtain a grain boundary-insulated semiconductor ceramic having electrical properties equal to or better than those obtained in the case when a Pb-based diffusing agent is used, without causing a decrease in the insulation resistance or the breakdown voltage.

The present invention is particularly effective in a semiconductor ceramic capacitor having a substantially tubular shape.

Specifically, where the semiconductor ceramic capacitor has a substantially thin-plate shape, such as a substantially disc shape, a metal oxide on the surfaces of crystal grains can easily thermally diffuse to form a desired a grain boundary insulating layer.

In the case where the component base 2 is formed so as to have a substantially tubular shape, such as a substantially rectangular tube, as illustrated in FIGS. 1 and 2, the component base 2 may have a large thickness between the inner peripheral surface and the outer peripheral surface thereof, that is, a large wall thickness of about 100 μm or more, for example. In the case where the component base 2 has a large wall thickness and is free of Pb (which is excellent in terms of diffusibility), it has been hitherto difficult to form a satisfactory grain boundary insulating layer.

However, even when the component base 2 has a large wall thickness, a metal oxide on the surfaces of crystal grains can be easily thermally diffused according to the present invention, and a semiconductor ceramic capacitor having desired electrical properties can be obtained without causing environmental pollution.

The semiconductor ceramic is not particularly limited as long as the semiconductor ceramic contains $SrTiO_3$ as a main component. For example, some of the Sr atoms may be replaced with Ba and/or Ca atoms. It is also preferable to incorporate a rare-earth element such as Y, La, or Sm in order to facilitate the formation of a semiconductor during the firing treatment. The molar ratio of the Sr site and the Ti site can be 1.000 in terms of stoichiometric composition. However, it is also preferable to mix a Sr compound and a Ti compound as required so that the semiconductor ceramic has a Sr-site-rich composition or a Ti-site-rich composition. Furthermore, it is also preferable to incorporate various additives as required in order to obtain desired electrical properties according to the intended use of the semiconductor ceramic.

The electrode materials of the inner peripheral electrode 3 and the outer peripheral electrode 4 are also not particularly limited. For example, a Ni—Sn alloy or a Ni—Cu alloy can be used. Each of the electrodes may be formed so as to have a two-layer structure by a plating method using these metal materials.

Next, a method for producing the semiconductor ceramic capacitor will be described in detail.

As ceramic raw materials, a Sr compound and a Ti compound, as required, a Ca compound, a Ba compound, a rare-earth element compound, and the like are prepared. Predetermined amounts of these ceramic raw materials are weighed. The ceramic raw materials are then sufficiently wet-mixed with a ball mill, and the resulting mixture is dried by evaporation. Subsequently, the mixture is calcined at a temperature of about 1,100° C. to 1,300° C. for about two hours to obtain a calcined product.

Next, an organic binder, a plasticizer, a dispersant, and water are added to the calcined product, and the resulting mixture is kneaded to prepare a slurry. The slurry is charged in a shaping die having a predetermined shape, formed so as to have a substantially tubular shape using an extruder or the like, and dried in a dryer. Subsequently, the dried tube is cut to have a substantially rectangular tube shape. Thus, a formed body is obtained. The formed body is fired at a temperature of about 400° C. to 1,100° C. for about four hours to remove the organic binder. Next, a firing treatment is performed in a reducing atmosphere of about 90% to 97% of $N_2$ and about 3% to 10% of $H_2$ at a temperature of about 1,400° C. to 1,500° C. for about three hours to obtain a sintered body having a substantially rectangular tube shape.

Next, a grain boundary insulating agent composed of a material free of Pb, for example, a material containing $Bi_2O_3$ and CuO is prepared. Furthermore, a $SiO_2$—$X_2O$-MO—$TiO_2$-based glass material that does not contain B or Pb is prepared as a glass component.

The grain boundary insulating agent and the glass component are mixed so that the content of the glass component is about 3 to 15 parts by weight relative to 100 parts by weight of the grain boundary insulating agent to prepare a diffusing agent.

Next, the diffusing agent is charged to a rotary heat-treatment furnace together with the sintered body. A heat treatment is performed in air at a temperature of about 1,100° C. to 1,200° C. for about two hours while mixing and stirring the sintered body and the diffusing agent so as to insulate the crystal grain boundaries of the sintered body. Thus, a component base 2 composed of a grain boundary-insulated semiconductor ceramic is prepared. The ratio of the diffusing agent to the sintered body is not particularly limited. For example, the diffusing agent is mixed so that the amount of diffusing agent is about 0.8 to 1.5 parts by weight relative to 100 parts by weight of the sintered body.

Next, at least one plating film is formed on each of the inner peripheral surface and the outer peripheral surface of the component base 2 by electroless plating and/or electrolytic plating, thereby forming an inner peripheral electrode 3 and an outer peripheral electrode 4. Thus, a semiconductor ceramic capacitor is prepared.

According to the present embodiment described above, the method for producing a semiconductor ceramic capacitor includes the steps of preparing a sintered by mixing ceramic raw materials including a Sr compound and a Ti compound and firing the resulting mixture in a reducing atmosphere, providing a grain boundary insulating agent composed of a material free of Pb and a glass component composed of a $SiO_2$—$X_2O$-MO—$TiO_2$-based glass material that does not contain B or Pb, and preparing a component base 2 by performing a heat treatment in an air atmosphere while mixing and stirring the sintered body with the grain boundary insulating agent and the glass component. Accordingly, even when the sintered body has a substantially tubular shape and has a large wall thickness, the diffusing agent can be uniformly or substantially uniformly distributed in the component base 2. Thus, crystal grain boundaries can be uniformly oxidized, and a desired grain boundary insulating layer can be obtained. The semiconductor ceramic capacitor thus obtained has good electrical properties such as electrostatic capacity, insulation resistance, and breakdown voltage, and is excellent in terms of practical use.

Figure 3:
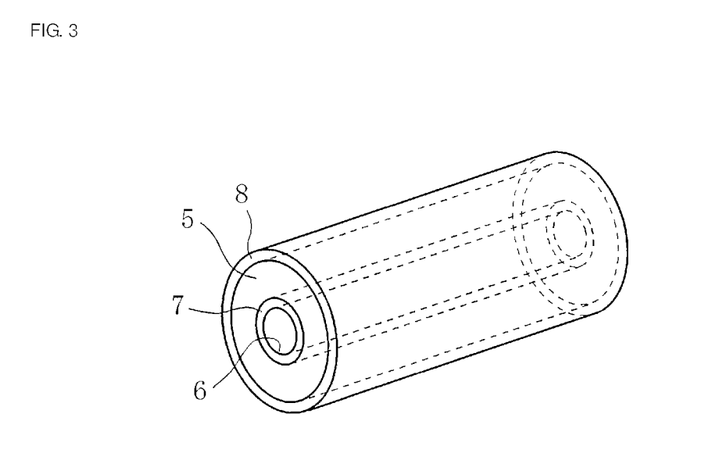
FIG. 3 is a perspective view that schematically illustrates a second embodiment of a semiconductor ceramic capacitor.

The present invention is not limited to the above embodiment. In the above embodiment, a semiconductor ceramic capacitor having a substantially rectangular tube shape has been described. However, for example, the present invention can also be applied to a semiconductor ceramic capacitor having a substantially circular tube shape as illustrated in FIG. 3.

Specifically, this semiconductor ceramic capacitor includes a component base 5 having a shape of a substantially circular tube in which a through-hole 6 is formed. This component base 5 is composed of the above-described semiconductor ceramic. An inner peripheral electrode 7 is formed on the inner peripheral surface of the component base 5, and an outer peripheral electrode 8 is formed on the outer peripheral surface of the component base 5.

The component base 5 of this semiconductor ceramic capacitor is also composed of the semiconductor ceramic capacitor of the present invention. Accordingly, a semiconductor ceramic capacitor that has good electrical properties and that is suitable for practical use can be obtained, although the diffusing agent does not contain Pb.

In the above embodiments, a semiconductor ceramic capacitor having a substantially tubular shape and a large wall thickness has been described. However, the shape of the semiconductor ceramic capacitor is not limited to a substantially tubular shape. The present invention can also be effectively applied to a semiconductor ceramic capacitor having other shapes, and in particular, those having a large thickness.

Next, Examples of the present invention will be specifically described.

EXAMPLE 1

Preparation of Grain Boundary Insulating Agents and Glass Components

As insulating raw materials, $Bi_2O_3$, CuO, and $Pb_3O_4$ were prepared. These insulating raw materials were mixed and prepared so as to have the component compositions shown in Table 1. Thus, grain boundary insulating agents A to E were prepared.

TABLE 1

| Type of grain boundary insulating agent | Component composition (wt %) | | |
| --- | --- | --- | --- |
| | $Bi_2O_3$ | CuO | $Pb_3O_4$ |
| A | 85 | 15 | — |
| B | 90 | 10 | — |
| C | 95 | 5 | — |
| D | 98 | 2 | — |
| E* | 47.5 | 5 | 47.5 |

*Out of the range of the present invention

As is apparent from Table 1, grain boundary insulating agents A to D contain $Bi_2O_3$ and CuO and do not contain $Pb_3O_4$. Accordingly, grain boundary insulating agents A to D are grain boundary insulating agents within the range of the present invention.

In contrast, grain boundary insulating agent E contains 47.5% by weight of $Pb_3O_4$. Accordingly, grain boundary insulating agent E is a grain boundary insulating agent outside of the range of the present invention.

Next, as glass raw materials, $SiO_2$, $Li_2O_3$, $M_2CO_3$ (where M represents Sr, Ba, or Ca), $TiO_2$, $B_2O_3$, $Al_2O_3$, ZnO, and $Bi_2O_3$ were prepared. These glass raw materials were mixed and prepared so as to have the component compositions shown in Table 2. Thus, glass components a to h were prepared.

TABLE 2

| Type of glass component | SiO$_2$ | Li$_2$O | MO M | MO Content (mol %) | TiO$_2$ | B$_2$O$_3$ | Al$_2$O$_3$ | ZnO | Bi$_2$O$_3$ |
|---|---|---|---|---|---|---|---|---|---|
| a  | 50 | 15 | Sr       | 27    | 8  | —  | —  | —  | —  |
| b  | 46 | 24 | Ba/Sr    | 10/10 | 10 | —  | —  | —  | —  |
| c  | 48 | 30 | Ba/Sr/Ca | 8/6/5 | 3  | —  | —  | —  | —  |
| d  | 40 | 36 | Sr/Ca    | 8/10  | 6  | —  | —  | —  | —  |
| e* | 30 | 8  | Ba/Ca    | 6/36  | —  | 20 | —  | —  | —  |
| f* | 43 | —  | Ca       | 43    | —  | 8  | 6  | —  | —  |
| g* | 35 | 10 | Ca       | 13    | —  | 24 | —  | 9  | 9  |
| h* | 12 | —  | Ba/Ca    | 10/20 | —  | 30 | —  | 25 | 3  |

*Out of the range of the present invention

As is apparent from Table 2, glass components a to d are each composed of a $SiO_2$—$Li_2O$-MO—$TiO_2$-based glass material, and do not contain $B_2O_3$ or a Pb component. Accordingly, glass components a to d are glass components within the range of the present invention.

In contrast, glass components e to h do not contain $TiO_2$ and contain $B_2O_3$ and other components. Accordingly, glass components e to h are glass components out of the range of the present invention.

Preparation of Samples

As ceramic raw materials, $SrCO_3$, $CaCO_3$, $TiO_2$, and $Y_2O_3$ were prepared. These ceramic raw materials were weighed so as to have a composition of $(Sr_{0.795}Ca_{0.200}Y_{0.005})TiO_3$. Next, these ceramic raw materials were wet-mixed with a ball mill for 16 hours, and the resulting mixture was dried by evaporation. The mixture was then calcined at a temperature of 1,150° C. for two hours to obtain a calcined product. Next, an organic binder, a plasticizer, a dispersant, and water are added to the calcined product, and the resulting mixture was kneaded to prepare a slurry. This slurry was charged in a shaping die having a predetermined shape, formed so as to have a tubular shape using an extruder, and dried in a dryer. Subsequently, the dried tube was cut to have a rectangular tube shape. Thus, a formed body was obtained. The formed body was fired at a temperature of 400° C. to 1,100° C. for four hours to remove the organic binder. Next, a firing treatment was performed in a reducing atmosphere of 95% of $N_2$ and 5% of $H_2$ at a temperature of 1,400° C. to 1,450° C. for three hours to obtain a sintered body having a rectangular tube shape. The sintered body had a side length of 1.7 mm, an inner diameter of 1.0 mm, and a length of 40 mm.

Next, diffusing agents were prepared by mixing 0 to 30 parts by weight of one of glass components a to h having the compositions shown in Table 2 with 100 parts by weight of one of grain boundary insulating agents A to E having the compositions shown in Table 1.

Each of the diffusing agents was weighed so that the amount of diffusing agent was 0.8 to 1.5 parts by weight relative to 100 parts by weight of the sintered body having the rectangular tube shape. The diffusing agent was placed in an alumina sagger having a cylindrical shape together with 1,000 sintered bodies. The sagger was charged into a rotary heat-treatment furnace and rotated in the heat-treatment furnace. Thus, heat treatment was performed in air at a temperature of 1,100° C. to 1,150° C. for two hours while mixing and stirring the sintered bodies and the diffusing agent in the sagger, thereby insulating the crystal grain boundaries of the sintered bodies. Component bases composed of a grain boundary-insulated semiconductor ceramic were obtained.

Subsequently, a nickel film was formed on each of the inner peripheral surface and the outer peripheral surface of each of the component bases by electroless nickel plating. A tin film was further formed on the surface of the nickel film by electrolytic tin plating to form electrodes each having a two-layer structure. Thus, semiconductor ceramic capacitors of sample Nos. 1 to 43 were prepared.

Next, the electrostatic capacity and dielectric loss of each of the samples of sample Nos. 1 to 43 were measured by applying a voltage of 1 Vrms at a frequency of 1 KHz using a precision LCR meter (4284A manufactured by Agilent Technologies).

The insulation resistance and breakdown voltage of each of the samples of sample Nos. 1 to 43 were measured by applying a voltage of 250 V using a digital ultra-high resistance/micro current meter (R8340A manufactured by Advantest Corporation).

Table 3 shows the composition and the content of the diffusing agents of sample Nos. 1 to 43, and measurement results of the samples of sample Nos. 1 to 43. Note that, each of the values of the electrostatic capacity shown in Table 3 is a value converted to an electrostatic capacity per unit length.

TABLE 3

| Sample No. | Diffusing agent Content relative to 100 parts by weight of main component (parts by weight) | Grain boundary insulating agent Composition | Glass component Composition | Glass component Content relative to 100 parts by weight of grain boundary insulating agent (parts by weight) | Electrostatic capacity (pF/mm) | Dielectric loss (%) | Insulation resistance (MΩ) | Breakdown voltage (V) |
|---|---|---|---|---|---|---|---|---|
| 1 | 0.8 | C | b | 3 | 2,060 | 0.2 | 8,200 | 890 |
| 2 | 0.8 | C | b | 5 | 2,010 | 0.3 | 9,100 | 900 |
| 3 | 0.8 | C | b | 10 | 2,040 | 0.3 | 9,600 | 920 |
| 4 | 0.8 | C | b | 15 | 2,040 | 0.3 | 10,000 | 930 |
| 5 | 0.8 | C | c | 5 | 2,050 | 0.3 | 11,000 | 920 |
| 6 | 1.0 | A | a | 5 | 2,040 | 0.5 | 8,200 | 900 |
| 7 | 1.0 | A | d | 5 | 2,020 | 0.6 | 8,400 | 910 |
| 8 | 1.0 | B | b | 5 | 2,050 | 0.3 | 9,300 | 920 |
| 9 | 1.0 | B | c | 5 | 2,050 | 0.3 | 9,800 | 940 |
| 10 | 1.0 | C | c | 3 | 2,040 | 0.2 | 8,600 | 900 |
| 11 | 1.0 | C | a | 5 | 2,060 | 0.3 | 10,000 | 950 |
| 12 | 1.0 | C | b | 5 | 2,050 | 0.3 | 13,000 | 980 |
| 13 | 1.0 | C | c | 5 | 2,060 | 0.3 | 14,000 | 1,080 |
| 14 | 1.0 | C | d | 5 | 2,040 | 0.2 | 13,000 | 1,000 |
| 15 | 1.0 | C | c | 10 | 2,040 | 0.3 | 15,000 | 1,150 |
| 16 | 1.0 | C | c | 15 | 2,000 | 0.3 | 14,000 | 1,000 |
| 17 | 1.0 | D | a | 5 | 2,020 | 0.3 | 10,000 | 910 |
| 18 | 1.0 | D | d | 5 | 2,050 | 0.2 | 12,000 | 970 |
| 19 | 1.2 | B | b | 5 | 2,000 | 0.6 | 10,000 | 930 |
| 20 | 1.2 | B | c | 5 | 2,000 | 0.6 | 9,400 | 900 |
| 21 | 1.2 | C | b | 3 | 2,030 | 0.3 | 8,800 | 890 |
| 22 | 1.2 | C | b | 5 | 2,010 | 0.3 | 9,200 | 950 |
| 23 | 1.5 | C | b | 3 | 2,030 | 0.3 | 8,900 | 900 |
| 24 | 1.5 | C | b | 5 | 2,020 | 0.4 | 11,000 | 960 |
| 25 | 1.5 | C | b | 10 | 2,020 | 0.4 | 12,000 | 1,020 |
| 26 | 1.5 | C | b | 15 | 2,000 | 0.4 | 12,000 | 980 |
| 27 | 1.5 | C | c | 5 | 2,000 | 0.3 | 14,000 | 1,000 |
| 28* | 1.2 | E | — | 0 | 2,050 | 0.3 | 7,000 | 880 |
| 29* | 1.0 | C | — | 0 | 1,970 | 0.3 | 1,400 | 460 |
| 30* | 1.2 | C | — | 0 | 1,980 | 0.3 | 3,000 | 540 |
| 31* | 1.5 | C | — | 0 | 1,970 | 0.3 | 3,100 | 550 |
| 32* | 1.0 | C | b | 20 | 1,940 | 0.4 | 15,000 | 1,120 |
| 33* | 1.0 | C | b | 30 | 1,910 | 0.4 | 14,000 | 1,100 |
| 34* | 1.0 | C | e | 3 | 2,010 | 0.4 | 5,000 | 620 |
| 35* | 1.0 | C | f | 3 | 1,970 | 0.3 | 5,400 | 640 |
| 36* | 1.0 | C | g | 3 | 1,970 | 0.3 | 4,500 | 600 |
| 37* | 1.0 | C | h | 3 | 1,980 | 0.3 | 4,800 | 620 |
| 38* | 1.0 | C | e | 5 | 1,990 | 0.3 | 3,500 | 550 |
| 39* | 1.0 | C | f | 5 | 1,940 | 0.3 | 3,900 | 580 |
| 40* | 1.0 | C | g | 5 | 1,920 | 0.3 | 2,600 | 510 |
| 41* | 1.0 | C | h | 5 | 1,940 | 0.4 | 3,000 | 560 |
| 42* | 1.0 | C | f | 10 | 1,910 | 0.4 | 1,800 | 510 |
| 43* | 1.0 | C | g | 10 | 1,910 | 0.3 | 1,200 | 400 |

*Out of the range of the present invention

In sample No. 28, each of the electrical properties was satisfactory although no glass component was present. Grain boundary insulating agent E, which contained a Pb component, was used in sample No. 28.

In sample Nos. 29 to 31, grain boundary insulating agent C was used, and no glass component was contained in the diffusing agent. Therefore, the electrostatic capacity, the insulation resistance, and the breakdown voltage of sample Nos. 29 to 31 were inferior to those of sample No. 28.

In sample Nos. 32 and 33, the content of the glass component was large, i.e., 20 to 30 parts by weight relative to 100 parts by weight of the grain boundary insulating agent. The electrostatic capacities of these samples were decreased to 2,000 pF/mm or less.

In sample Nos. 34 to 43, glass components e to h, which contained boron (B), were used. As a result, the insulation resistance was decreased to 5,400 MΩ or less, and the breakdown voltage was also decreased to 640 V or less. In particular, the electrostatic capacity was also decreased to 2,000 pF/mm or less in sample Nos. 35 to 43.

In contrast, one of grain boundary insulating agents A to D of the present invention was used in sample Nos. 1 to 27, and 3 to 15 parts by weight of one of glass components a to d of the present invention was incorporated relative to 100 parts by weight of the grain boundary insulating agent. Accordingly, the electrostatic capacity of each of these samples was 2,000 pF/mm or more and the breakdown voltage thereof was 890 V or more. Thus, properties substantially the same as or higher than those of sample No. 28, which contained a Pb component, were obtained. The insulation resistance of each of these samples was 8,200 MΩ or more. Thus, insulation resistances significantly higher than that of sample No. 28, which contained a Pb component, were obtained.

Next, cross-sectional images of sample Nos. 11 and 38 were taken with a scanning electron microscope (hereinafter referred to as "SEM"), and the distribution state of bismuth (Bi) on the cross section was observed by wavelength dispersive X-ray spectroscopy (WDX).

Figure 4:
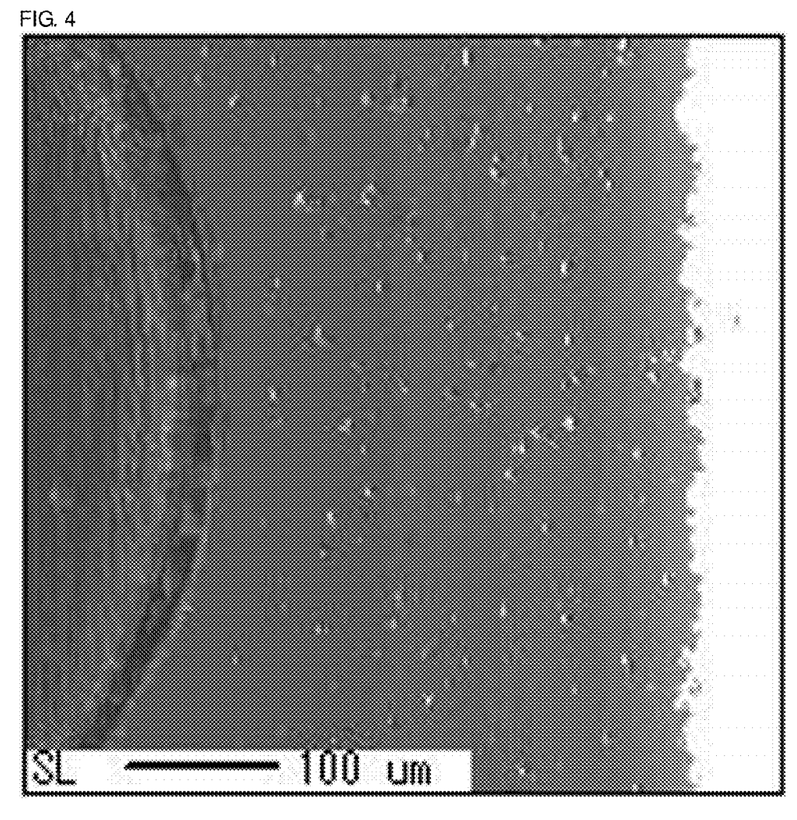
FIG. 4 is a scanning electron microscope (SEM) image of sample No. 11 of Example 1.
Figure 5:
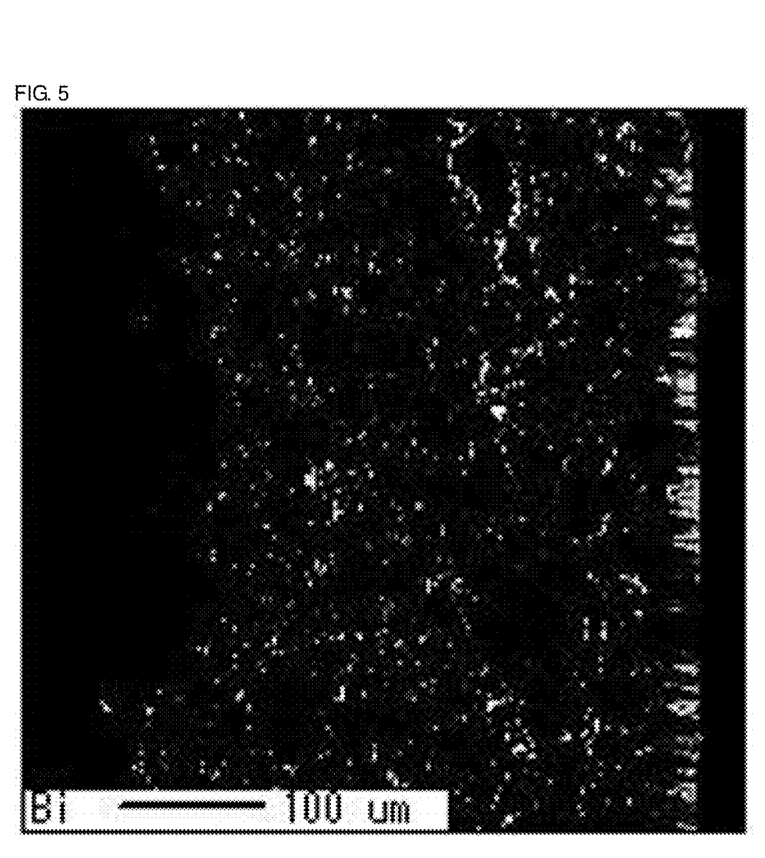
FIG. 5 is a photograph showing the distribution state of bismuth (Bi) of sample No. 11 of Example 1.
Figure 6:
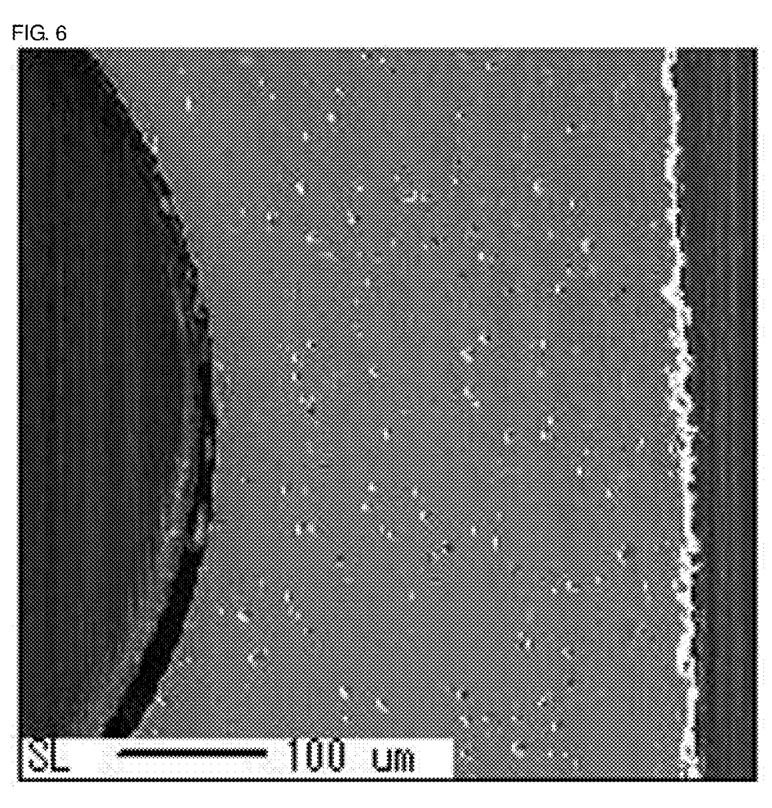
FIG. 6 is a SEM image of sample No. 38 of Example 1.
Figure 7:
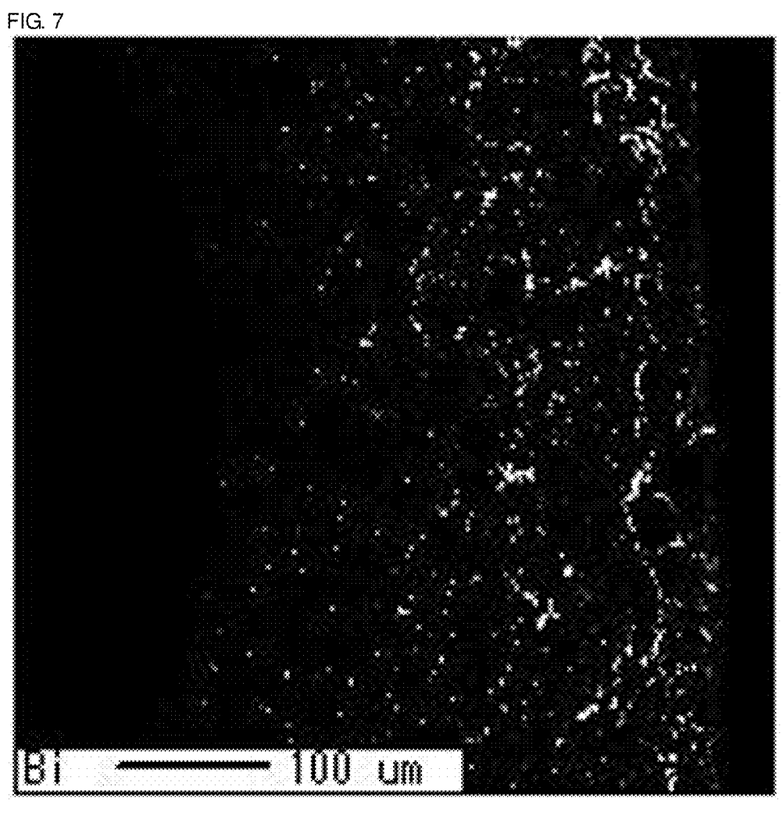
FIG. 7 is a photograph showing the distribution state of Bi of sample No. 38 of Example 1.

FIG. 4 is a SEM image of sample No. 11, and FIG. 5 shows the distribution state of Bi of sample No. 11. FIG. 6 is a SEM image of sample No. 38, and FIG. 7 shows the distribution state of Bi of sample No. 38. In FIGS. 4 and 6, the circular arc portion on the left side shows the inner peripheral surface of the sample, and the substantially linear portion on the right side shows the outer peripheral surface of the sample. The SEM images of FIGS. 4 and 6 positionally correspond to the distribution states of Bi observed as white spots in FIGS. 5 and 7, respectively.

As is apparent from FIGS. 6 and 7, the bismuth which diffused from the outer surface did not sufficiently diffuse in the component base up to the inner peripheral surface in sample No. 38, which was out of the range of the present invention.

In contrast, it was confirmed, as is apparent from FIGS. 4 and 5, that in sample No. 11, which was within the range of the present invention, the bismuth diffused from the outer surface substantially uniformly diffused in the component base up to the inner peripheral surface.

EXAMPLE 2

Slurries were prepared as in Example 1. Next, each of these slurries was charged in a shaping die having a predetermined shape, formed so as to have a tubular shape using an extruder, and dried in a dryer. Subsequently, the dried tube was cut to have a circular tube shape. Thus, a formed body was obtained. Thereafter, a sintered body having a circular tube shape was obtained by the same method and procedure as in Example 1. The sintered body had an outer diameter of 3.0 mm, an inner diameter of 1.6 mm, and a length of 2.5 mm.

Next, diffusing agents were prepared by mixing 0 to 15 parts by weight of one of glass components a to d with 100 parts by weight of one of grain boundary insulating agents A to E.

Each of the diffusing agents was weighed so that the amount of diffusing agent was 1.0 part by weight relative to 100 parts by weight of the sintered body having the circular tube shape. The diffusing agent was placed in an alumina sagger having a cylindrical shape together with 1,000 sintered bodies. The sagger was charged into a rotary heat-treatment furnace and rotated in the heat-treatment furnace. Thus, a heat treatment was performed in air at a temperature of 1,100° C. to 1,150° C. for two hours while mixing and stirring the sintered bodies and the diffusing agent in the sagger, thereby insulating the crystal grain boundaries of the sintered bodies. Component bases composed of a grain boundary-insulated semiconductor ceramic were obtained.

Electrodes were then formed on the inner peripheral surface and the outer peripheral surface of each of the component bases by the same method and procedure as in Example 1 to prepare samples of sample Nos. 51 to 65.

Subsequently, the electrostatic capacity, the dielectric loss, the insulation resistance, and the breakdown voltage of each of the samples of sample Nos. 51 to 65 were measured by the same method and procedure as in Example 1.

Table 4 shows the composition and the content of the diffusing agents of sample Nos. 51 to 65, and measurement results of the samples of sample Nos. 51 to 65.

TABLE 4

| | Diffusing agent | | | | Electrical properties | | | |
|---|---|---|---|---|---|---|---|---|
| | Content relative to 100 parts by weight of main component (parts by weight) | Grain boundary insulating agent Composition | Glass component Composition | Content relative to 100 parts by weight of grain boundary insulating agent (parts by weight) | | | | |
| Sample No. | | | | | Electrostatic capacity (nF) | Dielectric loss (%) | Insulation resistance (MΩ) | Breakdown voltage (V) |
| 51 | 1.0 | A | c | 5 | 5.1 | 1.2 | 38,000 | 1,800 |
| 52 | 1.0 | A | c | 8 | 5.1 | 1.3 | 41,000 | 1,900 |
| 53 | 1.0 | B | b | 5 | 5.1 | 0.9 | 42,000 | 2,000 |
| 54 | 1.0 | B | b | 8 | 5.0 | 0.8 | 45,000 | 2,100 |
| 55 | 1.0 | C | a | 3 | 5.1 | 0.8 | 40,000 | 1,800 |
| 56 | 1.0 | C | b | 5 | 5.1 | 0.8 | 42,000 | 2,000 |
| 57 | 1.0 | C | c | 5 | 5.1 | 0.7 | 45,000 | 2,100 |
| 58 | 1.0 | C | d | 5 | 5.1 | 0.8 | 42,000 | 1,900 |
| 59 | 1.0 | C | c | 3 | 5.1 | 0.8 | 41,000 | 1,800 |
| 60 | 1.0 | C | c | 8 | 5.1 | 0.7 | 50,000 | 2,200 |
| 61 | 1.0 | C | c | 15 | 5.0 | 0.8 | 46,000 | 2,000 |
| 62 | 1.0 | D | c | 3 | 5.1 | 0.8 | 40,000 | 1,900 |
| 63 | 1.0 | D | c | 5 | 5.1 | 0.9 | 42,000 | 2,000 |
| 64* | 1.0 | E | — | 0 | 5.1 | 0.8 | 33,000 | 1,600 |
| 65* | 1.0 | C | — | 0 | 4.6 | 0.7 | 21,000 | 1,000 |

*Out of the range of the present invention

In sample No. 64, each of the electrical properties was satisfactory although no glass component was present. Grain boundary insulating agent E, which contained a Pb component, was used in sample No. 64.

In sample No. 65, although grain boundary insulating agent C was used, no glass component was present in the diffusing agent. Therefore, the electrostatic capacity, the insulation resistance, and the breakdown voltage of sample No. 65 were inferior to those of sample No. 64.

In contrast, in sample Nos. 51 to 63, one of grain boundary insulating agents A to D of the present invention was used although no glass component was, and 3 to 15 parts by weight of one of glass components a to d of the present invention was incorporated therein relative to 100 parts by weight of the grain boundary insulating agent. Accordingly, the electrostatic capacity of each of these samples was 5.0 to 5.1 nF and the breakdown voltage thereof was 1,800 to 2,200 V. Thus, properties substantially the same as or higher than those of sample No. 64, which contained a Pb component, were obtained. The insulation resistance of each of these samples was 38,000 to 50,000 MΩ. Thus, insulation resistances significantly higher than that of sample No. 64 were obtained.

As described above, it is possible to realize a grain boundary-insulated semiconductor ceramic in which good electrical properties can be obtained without using a Pb-based material as a diffusing agent, a semiconductor ceramic capacitor including the grain boundary-insulated semiconductor ceramic, and a method for producing the semiconductor ceramic capacitor.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A grain boundary-insulated semiconductor ceramic comprising:
   a strontium titanate as a main component; and
   a diffusing agent containing a grain boundary insulating agent and a glass component,
   wherein the grain boundary insulating agent comprises a material free of lead,
   the glass component mainly comprises a $SiO_2$—$X_2O$-$MO$—$TiO_2$— based glass material that does not contain boron or lead, and in which X represents an alkali metal, and M represents at least one element selected from barium, strontium, and calcium, and
   the content of the glass component is 3 to 15 parts by weight relative to 100 parts by weight of the grain boundary insulating agent.

2. The grain boundary-insulated semiconductor ceramic according to claim 1, wherein the grain boundary insulating agent contains at least one of bismuth and copper.

3. The grain boundary-insulated semiconductor ceramic according to claim 2, wherein the content of the grain boundary insulating agent is 0.8 to 1.5 parts by weight relative to 100 parts by weight of the main component.

4. The grain boundary-insulated semiconductor ceramic according to claim 3, wherein the alkali metal X in the glass component is lithium.

5. The grain boundary-insulated semiconductor ceramic according to claim 1, wherein the content of the grain boundary insulating agent is 0.8 to 1.5 parts by weight relative to 100 parts by weight of the main component.

6. The grain boundary-insulated semiconductor ceramic according to claim 5, wherein the alkali metal X in the glass component is lithium.

7. The grain boundary-insulated semiconductor ceramic according to claim 1, wherein the alkali metal X in the glass component is lithium.

8. The grain boundary-insulated semiconductor ceramic according to claim 1, wherein the grain boundary insulating agent contains bismuth and copper.

9. The grain boundary-insulated semiconductor ceramic according to claim 1, wherein the strontium titanate contains at least one of Ba, Ca and a rare earth element.

10. The grain boundary-insulated semiconductor ceramic according to claim 9, wherein the rare earth element is Y.

11. A semiconductor ceramic capacitor comprising a component base comprising the grain boundary-insulated semiconductor ceramic according to claim 1.

12. The semiconductor ceramic capacitor according to claim 11,
    wherein the component base has a tubular shape, and
    has an electrode on each of an inner peripheral surface and an outer peripheral surface of the component base.

13. A semiconductor ceramic capacitor comprising a component base comprising the grain boundary-insulated semiconductor ceramic according to claim 4.

14. The semiconductor ceramic capacitor according to claim 13,
    wherein the component base has a tubular shape, and
    has an electrode on each of an inner peripheral surface and an outer peripheral surface of the component base.

15. A semiconductor ceramic capacitor comprising a component base comprising the grain boundary-insulated semiconductor ceramic according to claim 8.

16. The semiconductor ceramic capacitor according to claim 15,
    wherein the component base has a tubular shape, and
    has an electrode on each of an inner peripheral surface and an outer peripheral surface of the component base.

17. A method for producing a semiconductor ceramic capacitor, comprising the steps of:
    providing a reducing atmosphere sintered body which comprising strontium and titanium;
    providing a grain boundary insulating agent comprising a material free of lead and a glass component comprising a $SiO_2$—$X_2O$-$MO$—$TiO_2$-based glass material that does not contain boron or lead and in which X represents an alkali metal, and M represents at least one element selected from barium, strontium, and calcium; and
    preparing a component base by performing a heat treatment in an air atmosphere while mixing and stirring the sintered body with the grain boundary insulating agent and the glass component.

18. The method according to claim 17,
    wherein the sintered body has a tubular shape, and
    the method further comprises forming an electrode on each of an inner peripheral surface and an outer peripheral surface of the component base by a plating process.

19. The method according to claim 17 wherein the amount of the glass component is 3 to 15 parts by weight relative to 100 parts by weight of the grain boundary insulating agent.

* * * * *